United States Patent [19]

Furuse

[11] Patent Number: 4,670,847

[45] Date of Patent: Jun. 2, 1987

[54] PRESSURE VARIATION DETECTING TYPE LEAKAGE INSPECTION EQUIPMENT

[75] Inventor: Kiyoshi Furuse, Hino, Japan

[73] Assignee: Kabushiki Kaisha Kosumo Keiki, Tokyo, Japan

[21] Appl. No.: 674,908

[22] PCT Filed: Mar. 18, 1983

[86] PCT No.: PCT/JP83/00085

§ 371 Date: Nov. 9, 1984

§ 102(e) Date: Nov. 9, 1984

[87] PCT Pub. No.: WO84/03769

PCT Pub. Date: Sep. 27, 1984

[51] Int. Cl.$^4$ ............................................. G01M 3/32
[52] U.S. Cl. ..................................... 364/507; 364/558; 364/571; 364/580; 73/49.2; 73/52
[58] Field of Search ............... 364/150, 151, 176, 575, 364/580, 479, 558, 571, 507; 73/49.2, 49.3, 52

[56] References Cited

U.S. PATENT DOCUMENTS

| | | | |
|---|---|---|---|
| 3,504,528 | 4/1970 | Weinberg et al. | 73/49.3 |
| 3,839,900 | 10/1974 | Fukuda | 73/49.3 |
| 4,193,118 | 3/1980 | Nash et al. | 364/575 |
| 4,490,800 | 12/1984 | Powers | 364/558 |
| 4,571,986 | 2/1986 | Fujii et al. | 73/49.1 |

Primary Examiner—Errol A. Krass
Assistant Examiner—Daniel W. Juffernbruch
Attorney, Agent, or Firm—Pollock, Vande Sande and Priddy

[57] ABSTRACT

Pressure variation detecting type leakage inspection equipment which applies a fixed fluid pressure to an article to be inspected and judges whether the article is non-defective or defective, depending upon whether a change in the fluid pressure or in the differential pressure between the article under inspection and a comparison tank is within a prescribed value, data on pressure values or differential pressure values by respective measurement which are within a proper value range are stored in succession, the stored data are averaged to obtain a correction value, and data by each measurement is corrected by the correction value, thereby automatically correcting an error which varies owing to various factors. Thus a proper leakage inspection can be achieved.

7 Claims, 7 Drawing Figures

PRIOR ART
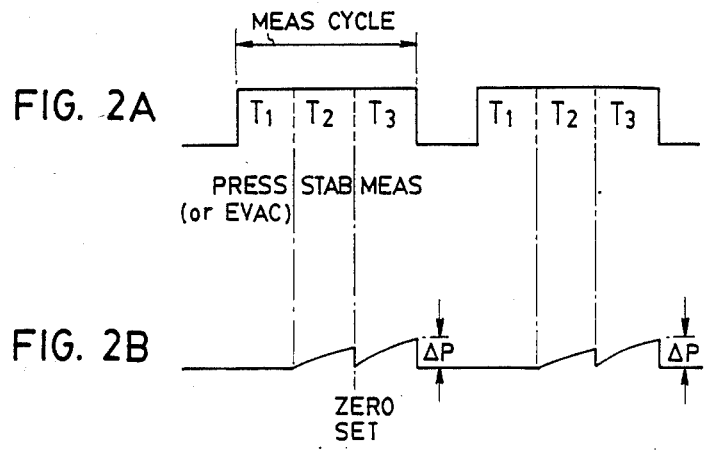
FIG. 2A
FIG. 2B
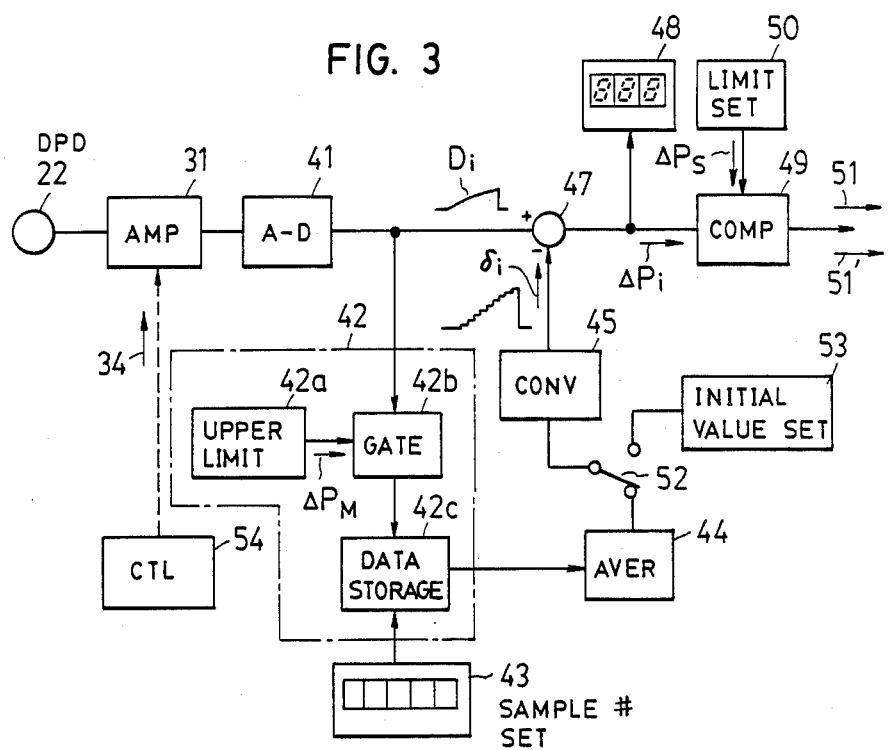
FIG. 3

PRESSURE VARIATION DETECTING TYPE LEAKAGE INSPECTION EQUIPMENT

CROSS REFERENCE TO RELATED APPLICATION

An improvement on the invention described herein is described in applicants' prior copending application Ser. No. 666,082 filed Oct. 29, 1984, for "Leakage Inspection Method".

ART FIELD

The present invention relates to leakage inspection equipment by which products or parts, which are required to be free from a fluid leak or to limit a fluid leak within a prescribed range while in use, such as instruments or containers handling fluids, are inspected one after another during their production process to judge whether they are non-defective or defective.

BACKGROUND ART

Various instruments such as an engine cylinder, a container of a waterproof watch, a gas appliance and so forth are required to be completely free from a gas or liquid leak or to suppress leakage within a specified limit. To meet this requirement, such instruments or parts are checked for leakage during their manufacturing process.

As leakage inspection equipment for such a leakage test, pressure variation detecting type leakage inspection equipment has already been put to practical use. This leakage inspection equipment is roughly divided into two inspection systems, one of which applies a positive or negative fluid pressure to the interior of an article under inspection and detects whether a change in the pressure is within a prescribed range, thereby judging whether the article under inspection is non-defective or defective, and the other of which applies a positive or negative fluid pressure to each of the articles under inspection and a comparison tank and measures a variation in the differential pressure therebetween, thereby judging whether the article under inspection is non-defective or defective.

In either system, a fluid pressure is applied to the article under inspection, a variation in the pressure or differential pressure is monitored for a certain period of time after the fluid pressure reached a predetermined value, and the article being inspected is judged non-defective or defective depending upon whether the variation in the pressure or differential pressure is within a prescribed range. In such an inspection, air is usually employed as the fluid. In the case of using pneumatic pressure as the fluid pressure, an error is introduced into the measured pressure value or differential pressure due to various factors such as the temperature of the article under inspection, ambient temperature, humidity, water content adhering to the article under inspection and its slight deformation by pressure.

If the error value is always constant, no particular trouble occurs since it is necessary only to hold the reference value for judgement constant. Since the error contained in the pressure or differential pressure value is caused in each factor incurs a variation in the error value, and it is difficult to predict the variation. Accordingly, in the case of continuously performing the inspection, it is necessary that the reference value for judgement be frequently modified in response to variations in the error value. For such reasons, the prior art has the defect that the leakage inspection cannot be automated.

An object of the present invention is to provide pressure variation detecting type leakage inspection equipment in which the pressure or differential pressure value is automatically corrected to eliminate the error value, thereby making it possible to automatically perform an appropriate leakage inspection at all times.

Another object of the present invention is to provide pressure variation detecting type leakage inspection equipment which permits an appropriate leakage inspection from the initial stage of inspection.

SUMMARY OF THE INVENTION

According to the present invention, in leakage inspection equipment in which a fixed fluid pressure is applied to an article to be inspected and detects, in terms of time, variations in the pressure of the article under inspection, or variations in the differential pressure between the article under inspection and a leak-free comparison tank supplied with the fixed fluid pressure, thereby judging whether the article under inspection is non-defective or defective, there are provided storage means for storing a predetermined number of measured data of the differential pressure associated with the articles which have been under inspection judged non-defective, calculating means for calculating an average value of the measured data stored in the storage means, and correcting means for correcting the measured data through using the average value obtained by the calculating means as a correction value for the measured data on the article being inspected, and a moving average of a plurality of preceding measured data is utilized as a correction value, by which the tendency of variation in the measured data resulting from various factors is detected, thereby making it possible to automatically correct variations in the measured data.

Therefore, according to the present invention, even if the measured data varies owing to various factors, the correction value is automatically corrected in response to the variation. As a result of this, an appropriate correction value can always be obtained and the leakage inspection equipment can be automated.

BRIEF DESCRIPTION OF THE DRAWINGS

FIG. 2 is a waveform diagram explanatory of the operation of FIG. 1;

FIG. 3 is a block diagram illustrating an embodiment of the present invention;

DESCRIPTION OF THE PREFERRED EMBODIMENTS

Figure 1:
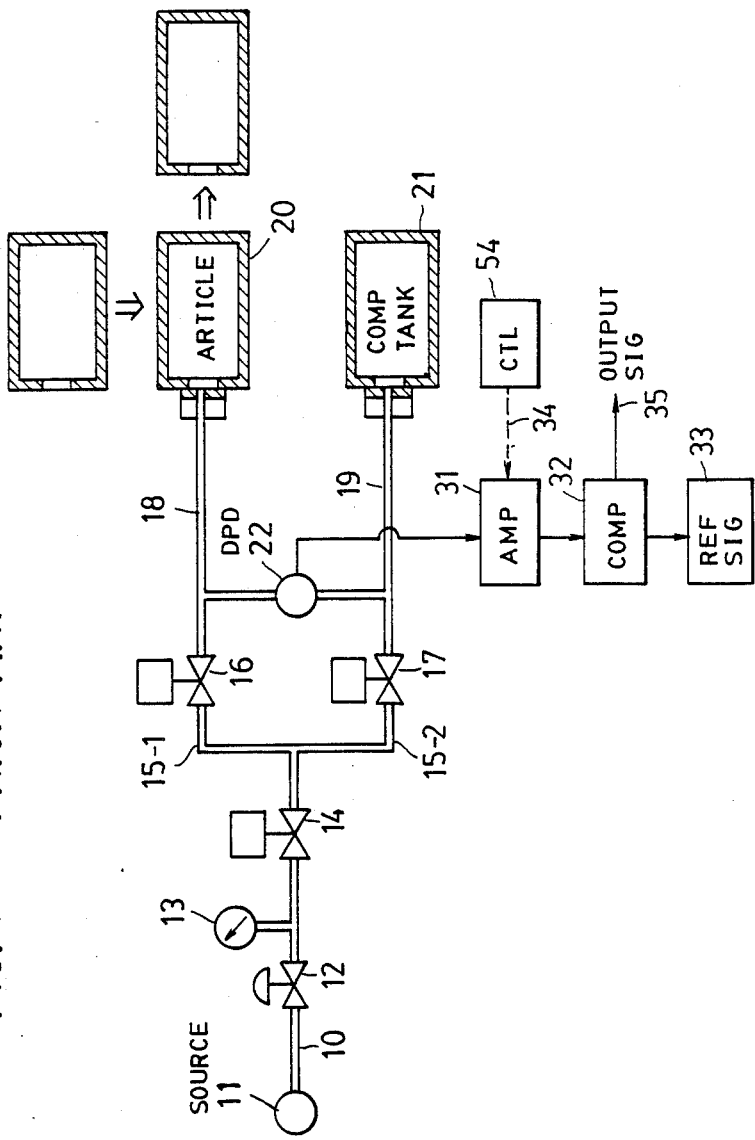
FIG. 1 is a block diagram explanatory of a conventional leakage inspection equipment.

To facilitate a better understanding of the present invention, a description will be given, with reference to FIGS. 1 and 2, of conventional pressure variation type leakage inpsection equipment. This example will be described in connection with differential pressure detecting type leakage inspection equipment.

A flow tube 10 connected to the output side of a pneumatic source 11 is connected via a regulating valve 12 to an electromagnetic valve 14 serving as a control valve and, at the outlet side of the electromagnetic valve 14, the flow tube is divided into two and connected to branches 15-1 and 15-2, respectively. A pressure gauge 13 for setting a checking pressure is connected between the outlet of the regulating valve 12 and the inlet of the electromagnetic valve 14.

The branch 15-1 is connected to one end of a conduit 18 via an electromagnetic valve 16 acting as a control valve, and the other end of the conduit 18 is provided with a mechanism to which is connected an article under inspection 20 which is checked for leakage. Articles 20 to be checked are connected to the mechanism at the end of the conduit 18 one after another for leakage inspection. On the other hand, the branch 15-2 is connected to one end of a conduit 19 via an electromagnetic valve 17 serving as a control valve, and the other end of the conduit 19 is connected to a comparison tank 21. A differential pressure detector 22 is provided between the conduits 18 and 19 on the side of the outlets of the electromagnetic valves 16 and 17.

An output signal of the differential pressure detector 22 is applied via an amplifier 31 to a comparator 32, wherein it is compared with an output reference value of a reference signal setting means 33.

After the article to be inspected 20 is attached to the end of the conduit 18 and the leak-free comparison tank 21 is attached to the conduit 19 and the electromagnetic valve 14 is closed, the regulating valve 12 is opened and the pneumatic pressure supplied from the pneumatic source 11 is controlled to assume a predetermined value according to the pressure gauge 13. Next, the electromagnetic valves 16 and 17 are opened, from which air of the fixed pressure, set in the open state of the electromagnetic valve 14, is supplied to the article under inspection 20 and the comparison tank 21 through the branches 15-1 and 15-2 and the conduits 18 and 19, respectively. This period of operation will herein be referred to as a pressurization or evacuation period, which is indicated by $T_1$ in FIG. 2A.

When the pressures in the article under inspection 20 and the comparison tank 21 have settled down with the lapse of the fixed time $T_1$ after the electromagnetic valves 16 and 17 were opened, the valves 16 and 17 are closed. After the lapse of a predetermined time $T_2$ for stablilzation, a zero-correction signal 34 is applied from a control means 54 to the automatic zero-correction type amplifier 31 connected to the differential pressure detector 22, by which the output of the amplifier 31 is preset to zero, and after a certain period of time $T_3$ following the zero setting, the output signal of the amplifier 31 is read out. The period of time $T_3$ from the zero-setting time point to the readout of the amplifier output will hereinafter be referred to as the measuring period. When the amplifier 31 is set to zero, its sensitivity is switched to high sensitivity, as required. Accordingly, when it is judged whether the article under inspection 20 is good or not, a detection signal from the differential pressure detector 22 is amplified by the amplifier 31 for readout.

A sequence of the period $T_1$ in which to open the electromagnetic valves 16 and 17 for pressurization, the period $T_2$ in which to close the electromagnetic valves 16 and 17 for pressure stabilization, and the period $T_3$ in which to set the amplifier 31 to zero for readout of its output, will hereinafter be referred to as a measurement cycle. The switching of the periods $T_1$, $T_2$ and $T_3$ is effected by the control means 54.

When the article under inspection 20 is completely gas-tight and leak-free, the output signal from the amplifier 31 goes to zero ideally in a fixed measurement time. When the article being inspected 20 leaks, there is obtained such an output signal that its internal pressure, if positive, gradually decreases and, if negative, graudually increases. The output signal yielded in the fixed measurement period $T_3$ assumes a value substantially proportional to the negative or positive leakage.

The reference signal from the reference signal setting means 33 and the output signal of the amplifier 31 are compared by the comparator 32, from which is obtained an output 35 which indicates whether the article under inspection is defective or non-defective depending upon whether the output signal of the amplifier exceeds the reference signal.

With this conventional pressure variation detecting type leakage test equipment, even if the comparison tank 21 is exactly identical in shape with the article under inspection 20 and leak-free, the output signal cannot be put into the ideal zero state if there is a temperature difference between the article under inspection 20 and the comparison tank 21, and/or variations in the ambient temperature, and/or slight deformations or distortions in shape, and/or a difference in attached water content and so forth, as mentioned previously. That is to say, due to these factors, even if the article under inspection 20 does not leak at all, the output signal available within the fixed detection time usually does not assume the ideal zero value but indicates a value $\Delta P$ corresponding to a certain positive or negative leakage, as shown in FIG. 2B.

If the error resulting from these factors remains unchanged for each measurement cycle, then it can be precorrected in use. In practice, however, atmosphere conditions in the long-term use, i.e. factors such as ambient temperature, humidity, the temperature of supplied air, the temperatures of the article being inspected 20 and the comparison tank 21 and their attached water contents, undergo gradual variations.

Furthermore, deformation of rubber for sealing an opening of the article being inspected also constitutes another factor. In the case where a number of articles 20 moving along a production process line are checked for leakage one after another, the error caused by these factors inevitably changes every hour, every day, every season or every year.

The conventional pressure variation detecting or differential pressure detecting leakage inspection equipment is accompanied by the error induced by the factors which vary with time, and hence calls for frequent modifications of the output reference value of the reference signal setting means 33 for judgement. This necessitates continuous attendance of an operator on the inspection equipment and is labor-comsuming, and hence is undesirable; in addition, with this manipulation, high precision leakage inspection is difficult to achieve.

FIG. 3 is a block diagram illustrating an embodiment of the present invention. The output end of the differential pressure detector 22 is connected to the input end of the amplifier 31, the output end of which is connected the input end of an A-D converter 41. The differential pressure detector 22, the amplifier 31 and the A-D converter 41 constitute measuring means. The output end of the A-D converter 41 is connected via a data correcting means 47 to the inputs of an output display 48 and a comparing means 49.

The output of the A-D converter 41 is also supplied to storage means 42. The storage means 42 comprises upper-limit value setting means 42a, gate means 42b which permits the passage therethrough of output data of the A-D converter 41 when it is smaller than an upper-limit value $\Delta P_M$ set in the setting means 42a and when the comparing means 49 judges that the article being inspected is non-defective and which inhibits the passage therethrough of the output data of the A-D converter 41 when it is larger than the upper-limit value $\Delta P_M$ or when the comparing means 49 judges that the article being inspected is defective, and measured data storage 42c for storing only the data which has passed through the gate means 42b. Therefore, the storage 42c stores measured data only in the case where it is smaller than the upper-limit value $\Delta P_M$ set in the setting means 42a and the comparing means 49 judges that the article under inspection is non-defective.

The measured data stored in the data storage 42c is read out therefrom corresponding to the number of data set in sample-number setting means 43 and is provided to average value calculating means 44.

The average value calculating means 44 calculates an average value of the data provided from the data storage 42c and supplies the average value via a change-over switch 52 to a correction value converting means 45. The correction value converting means 45 calculates a correction value $\delta_i = (T/T_3) \times \overline{D}_i$ on the basis of, for instance, the measurement period $T_3$ and the average value $\overline{D}_i$ supplied from the average value calculating means 44, T being an elapsed time and assumed to vary from 0 to $T_3$. By this calculation, the correction value converting means 45 provides the correction value $\delta_i$ as a digital code which gradually increases from $\delta_i = 0$ to $\delta_i = \overline{D}_i$ with the lapse of time T. The correction value $\delta_i$ is applied to the data correcting means 47 for correcting the measured data from the D-A converter 41.

According to the present invention, an initial value setting means 53 can be connected to the input side of the correction value converting means 45, instead of the average value calculating means 44. Only for a first measurement immediately after the start of operation, the measured data is corrected based on a value set in the initial value setting means 53, and for the subsequent measurement, an average value of the measured data from means 44 is used as a correction value. The average value is an average value of measured data of the number of samples set in the sample-number setting means 43. That is, in the case of the number of samples being set to N, the latest N measured data in the storage 42c are averaged. In the next measurement cycle, the oldest measured data is removed but instead the latest measured data is added and a total of N measured data are always averaged. This is commonly referred to as a moving average. Until the number of measured data stored in the storage 42c reaches the value N, an average value of the stored data is computed. Reference numeral 54 indicates control means for sequence-controlling operations of the respective parts.

Figure 4:
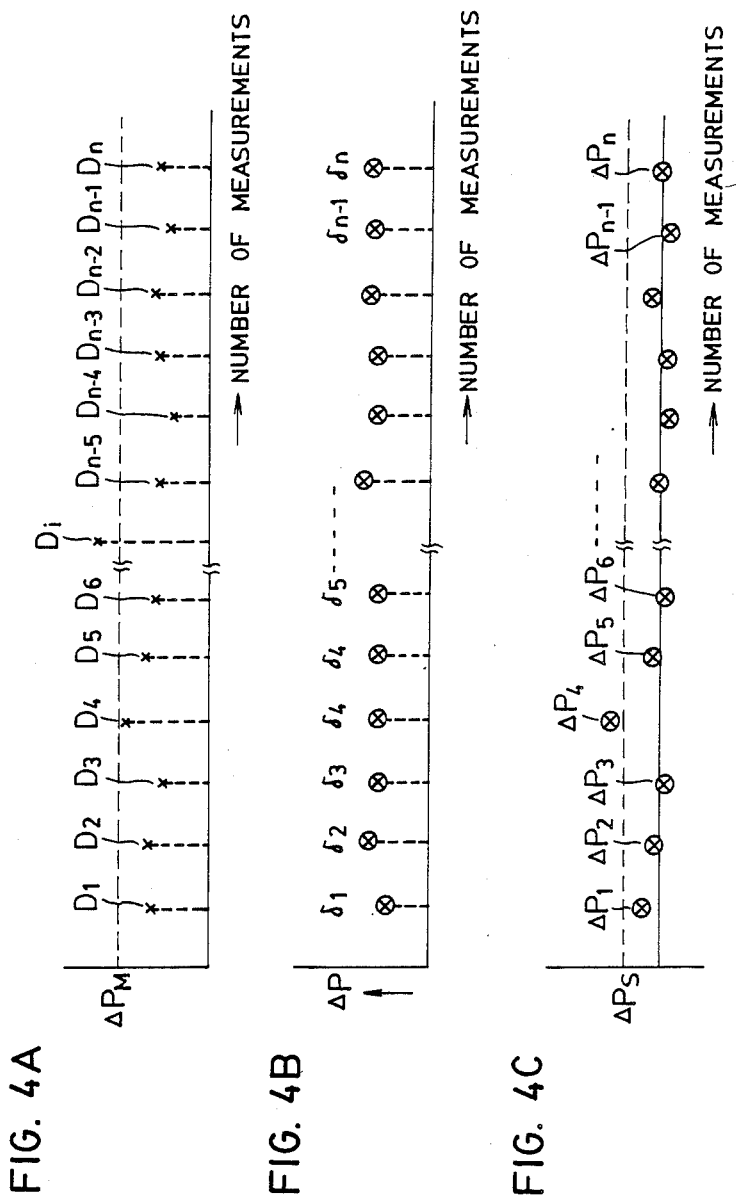
FIG. 4 is a block diagram explanatory of a correcting operation in the embodiment of FIG. 3.

The operation of the pressure variation detecting type leakage inspection equipment of the present invention is as follows: At the start of operation, the change-over switch 52 is connected to the side of the initial value setting means 53. In the initital valve setting means 53 is set a final average value obtained on the previous day or an empirically obtained average value fit for the season. With reference to FIG. 4, the correcting operation will be described. In FIG. 4A, $D_1$, $D_2$, $D_3$, ... $D_n$ are measured data obtained in respective measurement cycles. Of the measured data $D_1$ to $D_n$, for example, the data $D_i$ which exceeds the upper-limit value $\Delta P_M$ is inhibited by the gate means 42b from passing therethrough, and hence is not stored in the storage 42c. In FIG. 4B, $\delta_1$ to $\delta_n$ indicate correction values for correcting the measured data $D_1$ to $D_n$, respectively.

The first correction value $\delta_1$ is calculated from the initial value in the initial value setting means 53, and the measured data $D_1$ is corrected by the correction value $\delta_1$, thereby obtaining corrected data $\Delta P_1$ shown in FIG. 4C. The corrected data $\Delta P_1$ is applied to the comparing means 49, wherein it is compared with a limit value $\Delta P_S$ from a judgement limit setting means 50. If the corrected data $\Delta P_1$ is within the limit, then a non-defective signal 51 is yielded from the comparing means 49. The corrected data $\Delta P_1$ is also provided to the display 48, in addition to the comparing means 49, by which the corrected data value (a value corresponding to the differential pressure) is displayed.

In the second measurement cycle, the change-over switch 52 is connected to the side of the average value calculating means 44. Since the storage 42c has stored therein only the first measured data value $D_1$, this measured data value $D_1$ is used for producing a correction value $\delta_2$ for the second measured data $D_2$. In the third measurement, since the first and second measured data $D_1$ and $D_2$ are stored in the error storage 42c, the average value calculating means 44 calculates an average value $\overline{D}_3$ of the measured data $D_1$ and $D_2$, and the average value $\overline{D}_3$ is supplied to the correction value converting means 45 which produces a correction value $\overline{d}_3$ for correcting the third measured data $\Delta D_3$. If corrected data $\Delta P_3$ is smaller than the limit value $\Delta P_S$, the comparing means 49 produces the non-defective signal 51.

In a similar manner, the measured data $D_4$ is corrected through using a correction value $\delta_4$ produced from an average $\overline{D}_4$ of the measured data $D_1$, $D_2$ and $D_3$. As a result of this correction, corrected data $\Delta P_4$ is obtained, and if the data $\Delta P_4$ exceeds the limit value $\Delta P_S$, then the comparing means 49 yields a defective signal 51'. In this case, the measured data $D_4$ is not input into the storage 42c. Accordingly, the correction value $\delta_4$ is used again for the next measured data $D_5$.

In this way, the number of measured data increases one by one until the number of samples stored in the storage 42c reaches the number set in the sample-number setting means 43. After the number of samples has once reached the value N, an average value for each subsequent measurement cycle is computed from the latest N measured data in the storage 42c.

When the measured data $D_i$ in the ith measurement cycle exceeds the upper limit value $\Delta P_M$ set in the upper limit value setting means 42a, it is judged that there is an abnormal leakage in somewhere other than the article under inspection, and the measured data Di is not input into the storage 42c.

As described above, according to the present invention, even if the measured data gradually varies during inspection, successive articles, since the measured data are averaged and used for producing a correction value, an appropriate compensation for the variation can be achieved at all times. Accordingly, a high precision leakage test can be achieved continuously and automatically.

Furthermore, since measured value is corrected by a correction value produced from the inital value set in the initial value setting means 53 only in the first measurement cycle, and since in the subsequent measurement cycles an average value of measured data is used for producing the correction value, a high precision inspection can be effected from the start of the operation. Moreover, $\delta_i T/T_3 \times \overline{D}_i$ is calculated in the correction value converting means 45 so as to gradually increase with the lapse of time during each measurement period $T_3$, so that the correction value $\delta_i$ and the measured data output from the A-D converter 41 both increase substantially equally when the article under inspection is non-defective. Therefore, the corrected data at any point of time can be held at a small value. For this reason, even if the limit value set in the judgement limit setting means 50 is small, the corrected data at any points of time in the measurement period $T_3$ does not exceed the limit value $\Delta P_S$ in the case of the article being inspected being non-defective. This permits the limit value $\Delta P_S$ to be set at a small value and ensures a highly accurate leakage test. Accordingly, the present invention is of great utility when put to practical use.

Figure 5:
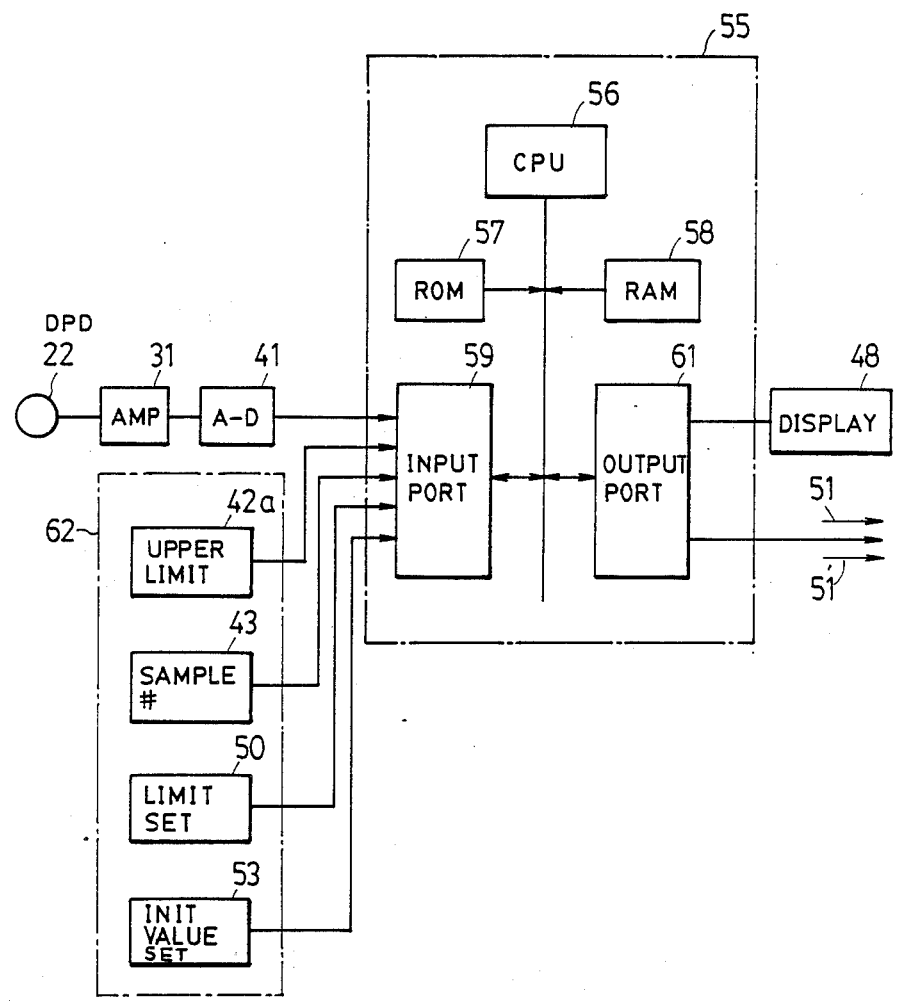
FIG. 5 is a block diagram illustrating another embodiment of the present invention.

FIG. 5, illustrates the case where the respective parts shown in FIG. 3 are formed by a microcomputer.

In FIG. 5, reference numeral 55 indicates a microcomputer. The microcomputer 55 can be made up of a central processor 56, a ROM 57, a RAM 58, an input port 59 and an output port 61, as is well-known. To the input port 59 is supplied digital measured data obtained by amplifying analog measured data from the differential pressure detector 22 by means of the amplifier 31 and then A-D converting the amplified output by means of the A-D converter 41. The central processor 56 inputs thereinto the measured data which are output from the A-D converter 41 at regular time intervals, for example, at time intervals of about 10 milliseconds.

To the input port 59 is connected a setting means 62, in addition to the A-D converter 41. To the setting means 62 are connected the upper-limit setting means 42a, the sample-number setting means 43 for computing an average value, the judgement limit setting means 50 and the initial value setting means 53, as described previously in connection with FIG. 3. The values set in these setting means 42a, 43, 50 and 53 are input into the central processor 56, wherein they are stored at specified addresses of the RAM 58.

Figure 6:
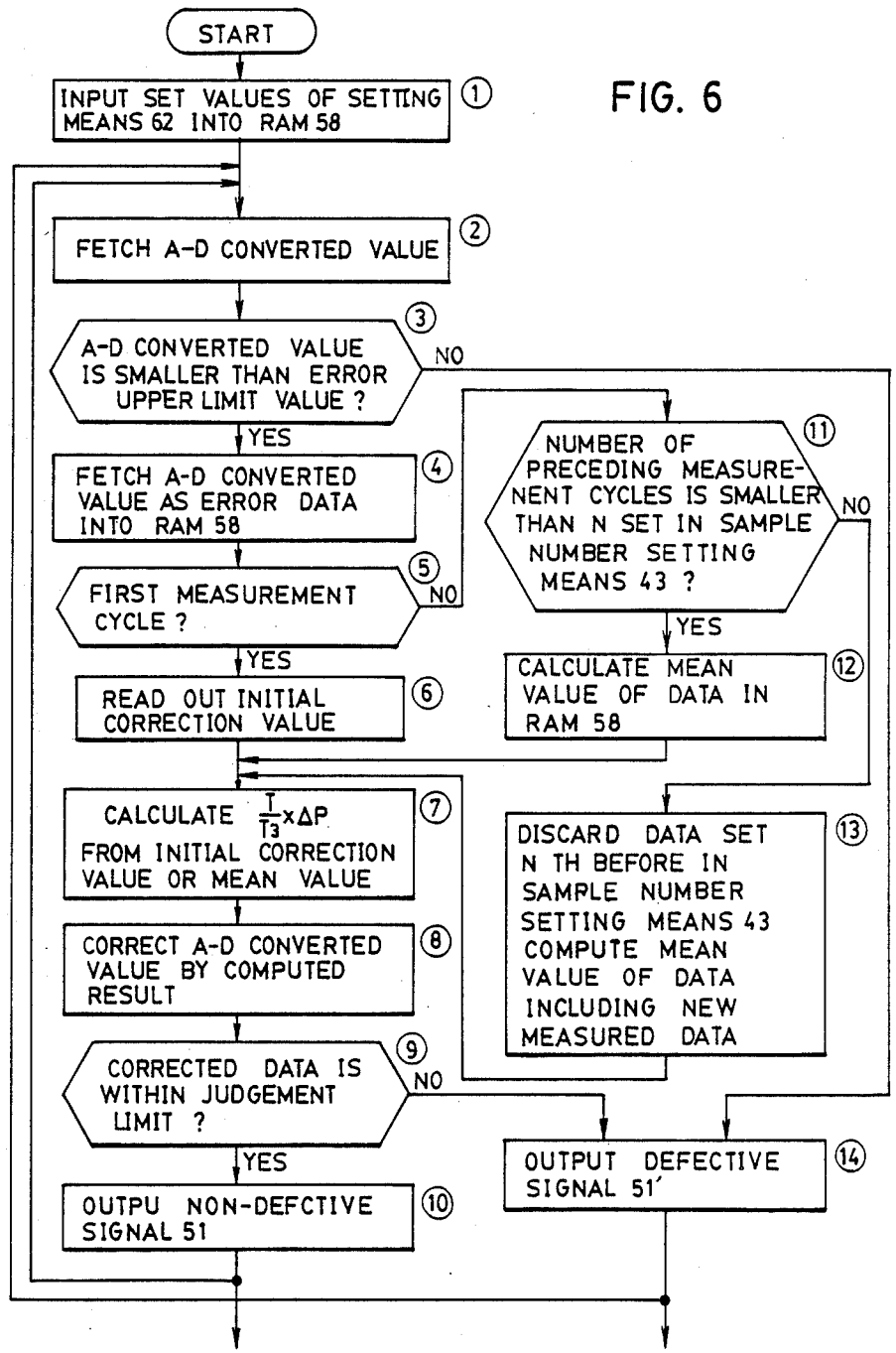
FIG. 6 is a flowchart explanatory of the operation of FIG. 5.

FIG. 6 shows a flowchart explanatory of the sequence of operation of the embodiment depicted in FIG. 5.

In step (1) the set values of the setting means 42a, 43, 50 and 53 are input into the RAM 58, as mentioned above. In step (2) the A-D converted value is input.

In step (3) it is judged whether the A-D converted value is smaller than the upper-limit value $\Delta P_M$. This judgement step (3) corresponds to the gate means 42b shown in FIG. 3, and when the A-D converted value is larger than the upper-limit value $\Delta P_M$, the process jumps to step (14), wherein the defective signal 51' is produced.

In step (4) the A-D converted value is input into the RAM 58.

In step (5) it is judged whether the current measurement cycle is a first one. If the measurement cycle is decided to be the first one, then the initial value is read out in step (6).

In case it is decided in step (5) that the measurement cycle is not the first one, the process jumps to step (11), in which it is judged whether the number of measurement cycles is larger or smaller than the number N set in the sample-number setting means 43. In the case where it is decided that the numbe of measurement cycles is smaller than the number N set in the sample-number setting means 43, an average value of measured data input into the RAM 48 is calculated in step (12).

When it is judged in step (11) that the number of measurement cycles is larger than the number N set in the sample-number setting means 43, the data preceded by N corresponding to the set number N is discarded and an average value is computed of measured data including the newly obtained A-D converted value in step (13).

In step (7) $(T/T_3) \times \overline{D}$ is calculated using the average value or the initial value, thereby obtaining a correction value $\delta$ that gradually increases with time. Accordingly, this step (7) corresponds to the correction value converting means 45 shown in FIG. 3.

In step (8) the A-D converted value is corrected by the correction value obtained in step (7). Accordingly step (8) corresponds to the data correcting means 47 shown in FIG. 3.

In step (9) it is judged whether the corrected data is within the judgement limi, and if so, the non-defective signal 51 is yielded in step (10). When the corrected data exceeds the judgement limit, the process jumps to step (14), in which the defective signal 51' is produced.

The above sequence of operations is performed by a program stored in the ROM 57 forming the microcomputer 55.

While in the foregoing the present invention has been described in connection with the differential pressure variation detecting type leakage inspection equipment, the invention is also applicable to a leakage inspection equipment of the type that applies a positive or negative fluid pressure to the article under inspection 20 and monitors variations in the fluid pressure to judge whether the article being inspected 20 is non-defective or defective, as explained at the beginning of this specification.

Figure 7:
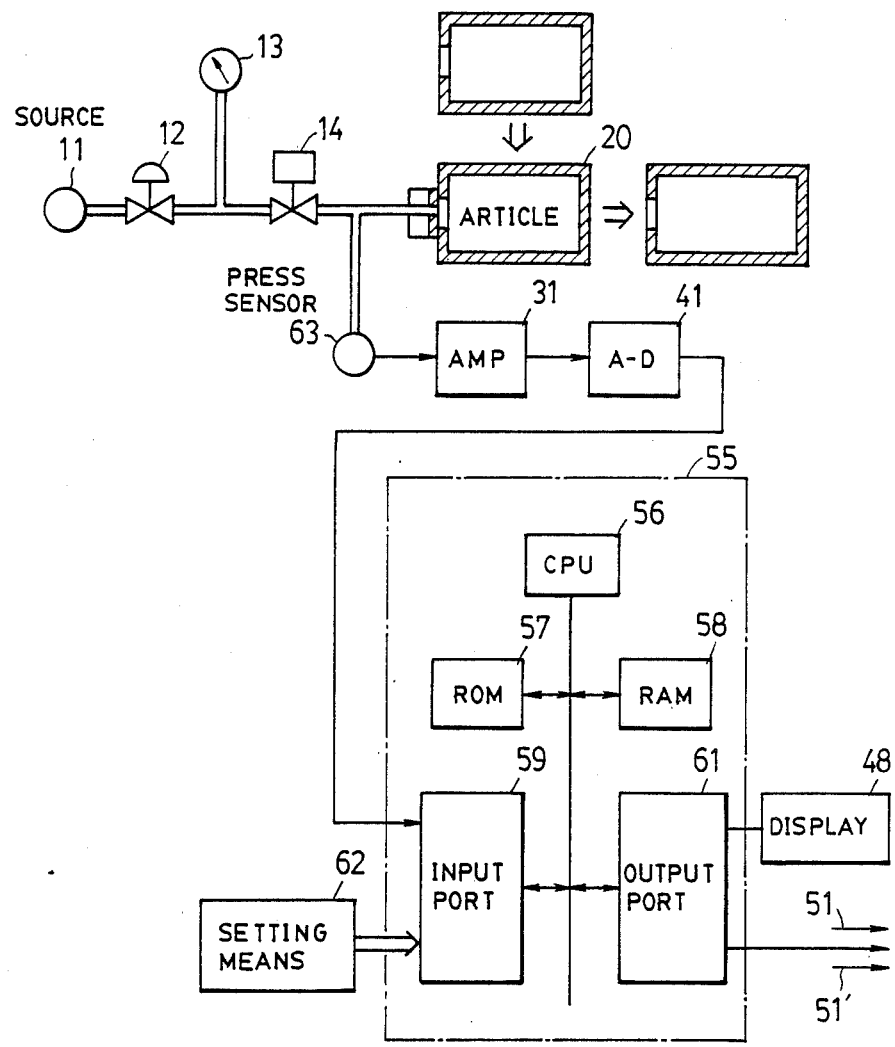
FIG. 7 is a block diagram illustrating another embodiment of the present invention.

FIG. 7 illustrates an example of this further embodiment of the invention. In FIG. 7, reference numeral 63 indicates a pressure detector. The fluid pressure applied to the article under inspection 20 is measured by the pressure detector 63, zero-setting is effected in the amplifier 31 and pressure variations from the zero point are subjected to an A-D conversion for input into the microcomputer 55.

This system permits simplification of the fluid supply structure in the measuring means, and hence possesses the advantage of low manufacturing costs.

Although the foregoing description relates to leakage inspection equipment of the type which applies a fluid pressure to the interior of the article under inspection 20, there is another type of leakage inspection equipment which, for example, when an article to be inspected is small like a water-proof wrist watch, applies a fixed positive or negative pressure to the interior of a leak-free container containing the article to be inspected and variations in the pressure are monitored from the moment of applying the fixed pressure to judge the presence or absence of leakage into article being inspected 20. The present invention is applicable to this type of leakage inspection equipment as well.

What is claimed is:

1. Pressure variation detecting type leakage inspection equipment which, in each measurement cycle, applies a fixed fluid pressure to an article to be inspected and measures variations in pressure associated with said article, said equipment comprising:

pressure detecting means for detecting a change in pressure associated with said article under inspection and producing a pressure signal;

amplifier means connected to the output of said pressure detecting means for receiving and amplifying said pressure signal, said amplifier means being zero-resettable and gain-adjustable;

zero-resetting means for resetting the output of said amplifier means to zero, starting a measurement period $T_3$ a fixed period after application of the fluid pressure in each measurement cycle;

an A-D converter connected to the output of said amplifier means for converting the output signal from said amplifier into digital measured data D;

storage means connected to the output of said A-D converter for storing said measured data D;

averaging means connected to said storage means for computing an average value $\overline{D}$ of as many as up to a predetermined number N of the measured data available in said storage means;

correction value converting means for receiving the average value $\overline{D}$ from said averaging means and operative to compute a correction value $\delta = D \cdot T/T_3$ at a time T from the start of said measurement period $T_3$ in each measurement cycle;

correcting means connected to the output of said correction value converting means for producing corrected data $\Delta P$ which is a difference between said measured data D and said correction value $\delta$; and comparing means connected to the output of said correcting means for comparing said corrected data $\Delta P$ to a judgment limit value $\Delta P_s$ and producing an indication signal indicating whether said article under inspection is defective or non-defective.

2. The leakage inspection equipment according to claim 1 where said storage means comprises gate means for inhibiting the measured data D from being stored in said storage means when said comparing means produces an indication signal which indicates that said article under inspection is defective.

3. The leakage inspection equipment according to claim 1 which further comprises an initial value setting means for setting therein an initial value, and switch means for selectively connecting the outputs of said averaging means and said initial value setting means to said correcting means so that, at least in the first measurement cycle, said initial value is provided to said correcting means in place of said average value $\overline{D}$.

4. Pressure variation detecting type leakage inspection equipment according to claim 1, 2 or 3 which comprises a control valve for applying a predetermined fluid pressure to the article to be inspected, said pressure detecting means being a pressure detector for detecting variations in the pressure applied to the article being inspected.

5. Pressure variation detecting type leakage inspection equipment according to claim 4, which comprises sequence control means for performing control by which the control valve is opened for a predetermined period of time and closed after a predetermined period of time, the amplifier means output is reset to zero a certain period of time after the moment of closure of the control valve, and a variation in the pressure inside or outside the article being inspected is A-D converted for output a predetermined period of time after the moment of zero resetting.

6. Pressure variation detecting type leakage inspection equipment according to claim 1 which comprises a control valve for applying a predetermined fluid pressure to each of the articles to be inspected and to a comparison tank, said pressure detecting means being a differential pressure detector for detecting the difference between the fluid pressure applied to an article being inspected and the fluid pressure applied to the comparison tank.

7. Pressure variation detecting type leakage inspection equipment according to claim 6 which comprises sequence control means for performing control by which the control valve is opened for a predetermined period of time to apply fluid pressure to the article to be inspected and the comparison tank and closed after a predetermined period of time, the amplifier means output is reset to zero a certain period of time after the moment of closure of the control valve, and the difference between the pressure inside or outside the article being inspected and the pressure of the comparison tank is A-D converted for output a predetermined period of time after the moment of zero resetting.

* * * * *